US008438266B2

(12) United States Patent
Beck

(10) Patent No.: US 8,438,266 B2
(45) Date of Patent: May 7, 2013

(54) FILE SHARING ADMINISTRATION

(75) Inventor: Robert L. Beck, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1485 days.

(21) Appl. No.: 11/548,610

(22) Filed: Oct. 11, 2006

(65) Prior Publication Data

US 2008/0091790 A1    Apr. 17, 2008

(51) Int. Cl.
*G06F 15/16* (2006.01)
*G06F 15/173* (2006.01)

(52) U.S. Cl.
USPC .............. 709/224; 709/229; 709/246; 726/26

(58) Field of Classification Search .................. 709/229, 709/224, 246; 726/26
See application file for complete search history.

(56) References Cited

U.S. PATENT DOCUMENTS

| | | | |
|---|---|---|---|
| 6,105,027 A * | 8/2000 | Schneider et al. | 707/9 |
| 6,892,245 B1 * | 5/2005 | Crump et al. | 709/245 |
| 7,260,649 B1 * | 8/2007 | Somasundaram et al. | 709/245 |
| 2004/0098583 A1 * | 5/2004 | Weber | 713/168 |
| 2004/0148503 A1 * | 7/2004 | Sidman | 713/167 |
| 2004/0181775 A1 * | 9/2004 | Anonsen et al. | 717/104 |
| 2004/0193599 A1 * | 9/2004 | Liu et al. | 707/7 |
| 2006/0005238 A1 * | 1/2006 | Izatt et al. | 726/12 |
| 2006/0062426 A1 * | 3/2006 | Levy et al. | 382/100 |
| 2007/0073837 A1 * | 3/2007 | Johnson-McCormick et al. | 709/217 |
| 2007/0130616 A1 * | 6/2007 | Ng et al. | 726/4 |

* cited by examiner

*Primary Examiner* — Aaron Strange
(74) *Attorney, Agent, or Firm* — Lee & Hayes, PLLC

(57) ABSTRACT

A file sharing service facilitates file sharing between a client and a host over a network. An extensible architecture provides an interface by which the file sharing service can be expanded to include additional functionality. This additional functionality may include resource management, security management, management of user experience, and the like. For example, users or administrators of the host or another computing device on the network may wish to oversee the file sharing service as a whole and/or individual file sharing transactions. The extensible file sharing described herein allows users, administrators, or other third party developers to expand or enhance a file sharing service or application to provide virtually any desired functionality.

16 Claims, 7 Drawing Sheets

FILE SHARING ADMINISTRATION

BACKGROUND

Data may be transferred between computers in a variety of ways. File sharing is one way in which users of computers may share resources, such as documents, software programs, and the like, with other computer users on a network. Generally, a user of a host computer, server, or other computing device designates some or all of the files on the computing device as shared files, which may be viewed and downloaded by other users of the network (known as clients). However, existing file sharing services have limited functionality and are generally not extensible to allow the functionality of the file sharing service to be easily expanded by developers.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, this disclosure describes an extensible file sharing service that allows users, administrators, or other third party developers to expand or enhance a file sharing service or application to provide virtually any desired functionality. In one implementation, a file sharing service facilitates file sharing between a client and a host over a network, and an extensible architecture provides an interface by which the file sharing service can be expanded to include additional functionality.

In another implementation, some or all file sharing communications between a client and a host are monitored and exposed to a module, which may provide instructions for handling the communications. One or more of the file sharing communications is intercepted, and filtered in accordance with instructions received from the module. In this manner, file sharing may be administered and/or controlled.

BRIEF DESCRIPTION OF THE DRAWINGS

In the figures, the left-most digit of a reference number identifies the figure in which the designated component or act first appears.

DETAILED DESCRIPTION

Overview

This disclosure is directed to an extensible file sharing service. File sharing enables a user of a host computer, server, or other computing device designates some or all of the files on the computing device as shared files, which may be accessed by other users of a network. Users of client computers, servers, or other computing devices may view and download the shared files from the host via the network. In some instances, users or administrators may wish to expand or enhance an existing file sharing service or application to add additional functionality, such as resource management, security management, management of user experience, and the like. For example, users or administrators of the host or another computing device on the network may wish to oversee the file sharing service as a whole and/or individual file sharing transactions. The extensible file sharing described herein allows users, administrators, or other third party developers to expand or enhance a file sharing service or application to provide virtually any desired functionality.

While exemplary implementations are described in connection with Windows® File Sharing, offered by Microsoft Corporation, of Redmond, Wash., the extensible file sharing described herein is applicable to any file sharing system or environment.

Exemplary File Sharing System

Figure 1:
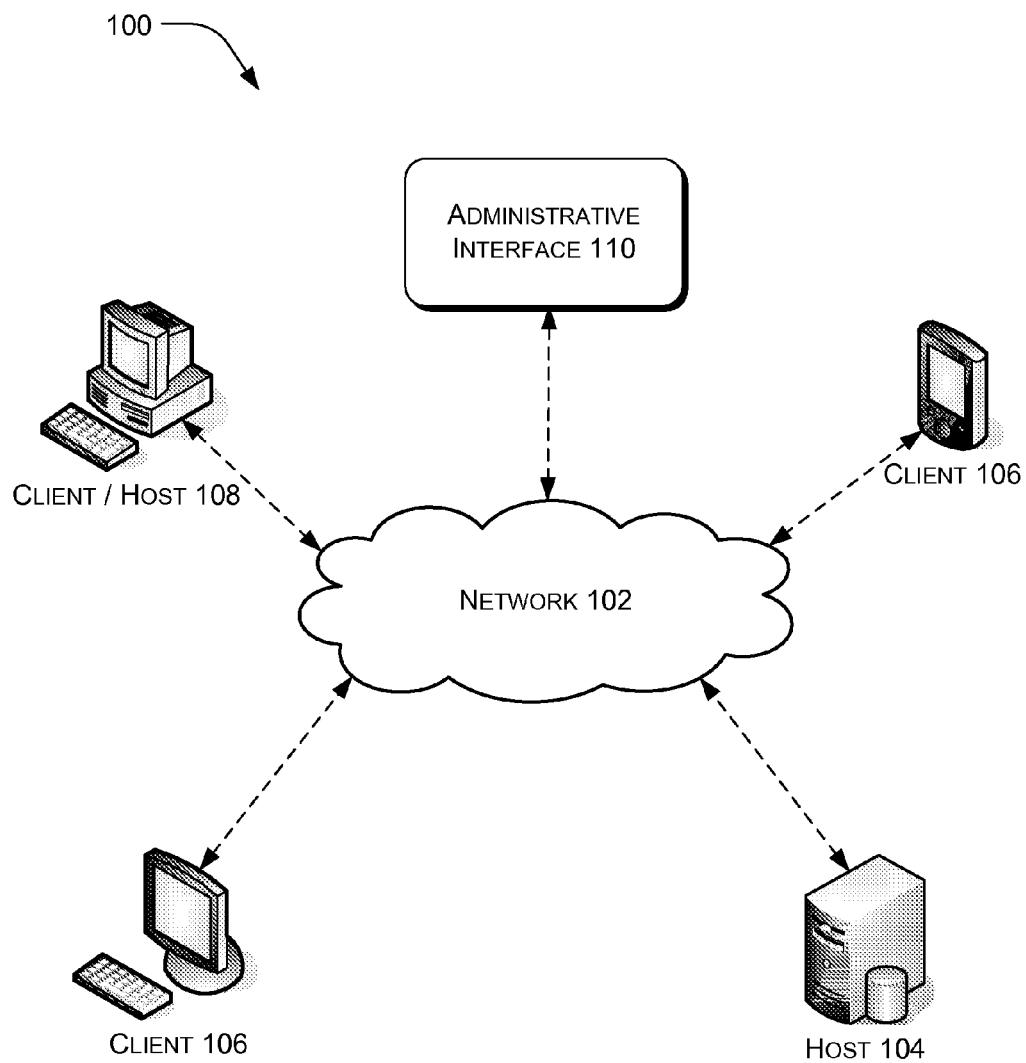
FIG. 1 is a schematic view of an exemplary configuration in which a file sharing service may be applicable.

FIG. 1 shows an exemplary extensible file sharing system 100. The system 100 includes a number of computing devices coupled to a network 102. A host computing device 104 contains files, programs, or other resources that are shared for viewing and/or download by client computing devices 106 on the network 102. Some computing devices on the network 102, such as client/host 108, may act as both a host and a client. That is, for example, client/host 108 may be used to access shared information from host 104, and may also include a number for files that are shared for access by other clients.

An administrative interface 110 is coupled to the network for administering file sharing over the network 102. The administrative interface 110 may be provided through any of the host, client, or client/host computing devices on the network, or may be provided as a separate computing device on the network. In the illustrated system 100, the administrative interface 110 is a separate computing device coupled to the network 102. Through the administrative interface, a human administrator and/or an administration program is able to monitor, intercept, modify, or otherwise administer file sharing communications on the network 102.

Figure 2:
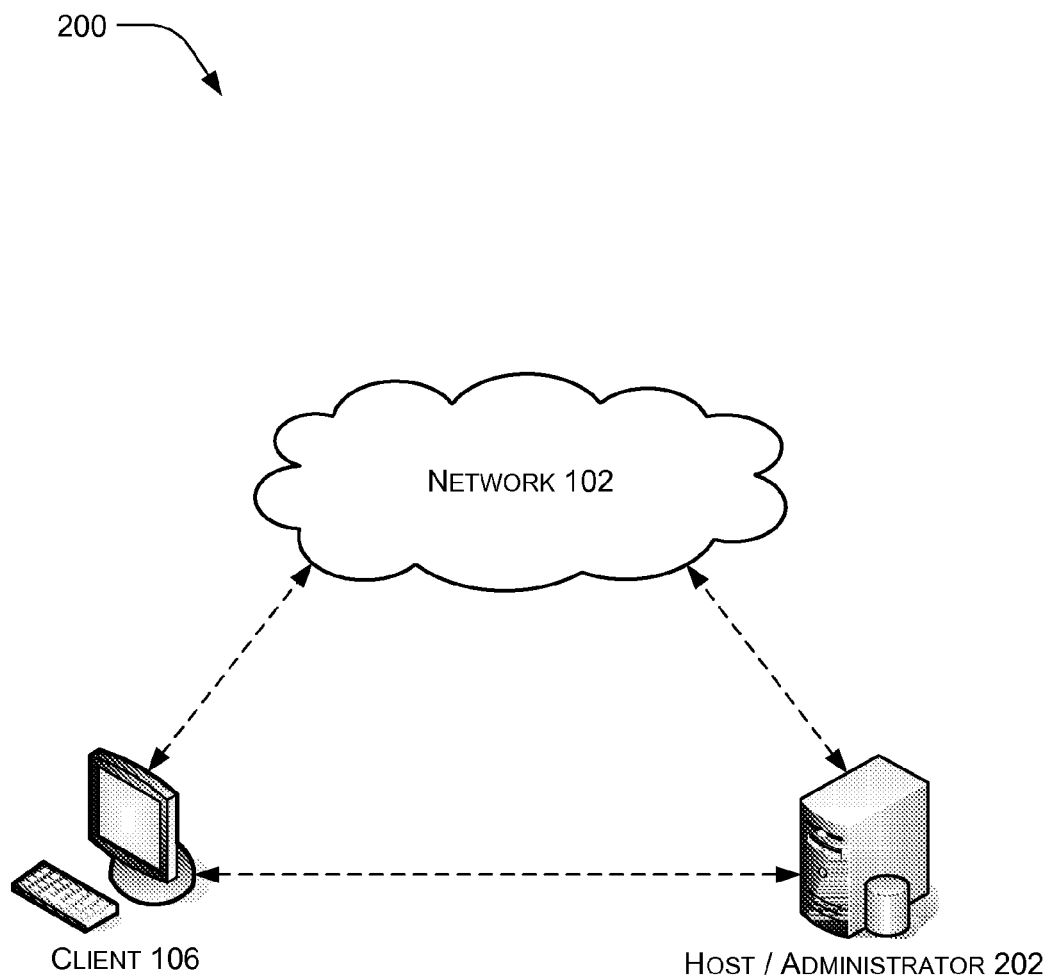
FIG. 2 is a schematic view of another exemplary configuration in which a file sharing service may be applicable.

FIG. 2 shows another exemplary system 200, in which the administrative interface is provided through a host/administrator 202 computing device on the network 102. In this implementation, file sharing may be administered directly by a user or administrator of the device sharing files (i.e., the host administrator 202).

Figure 3:
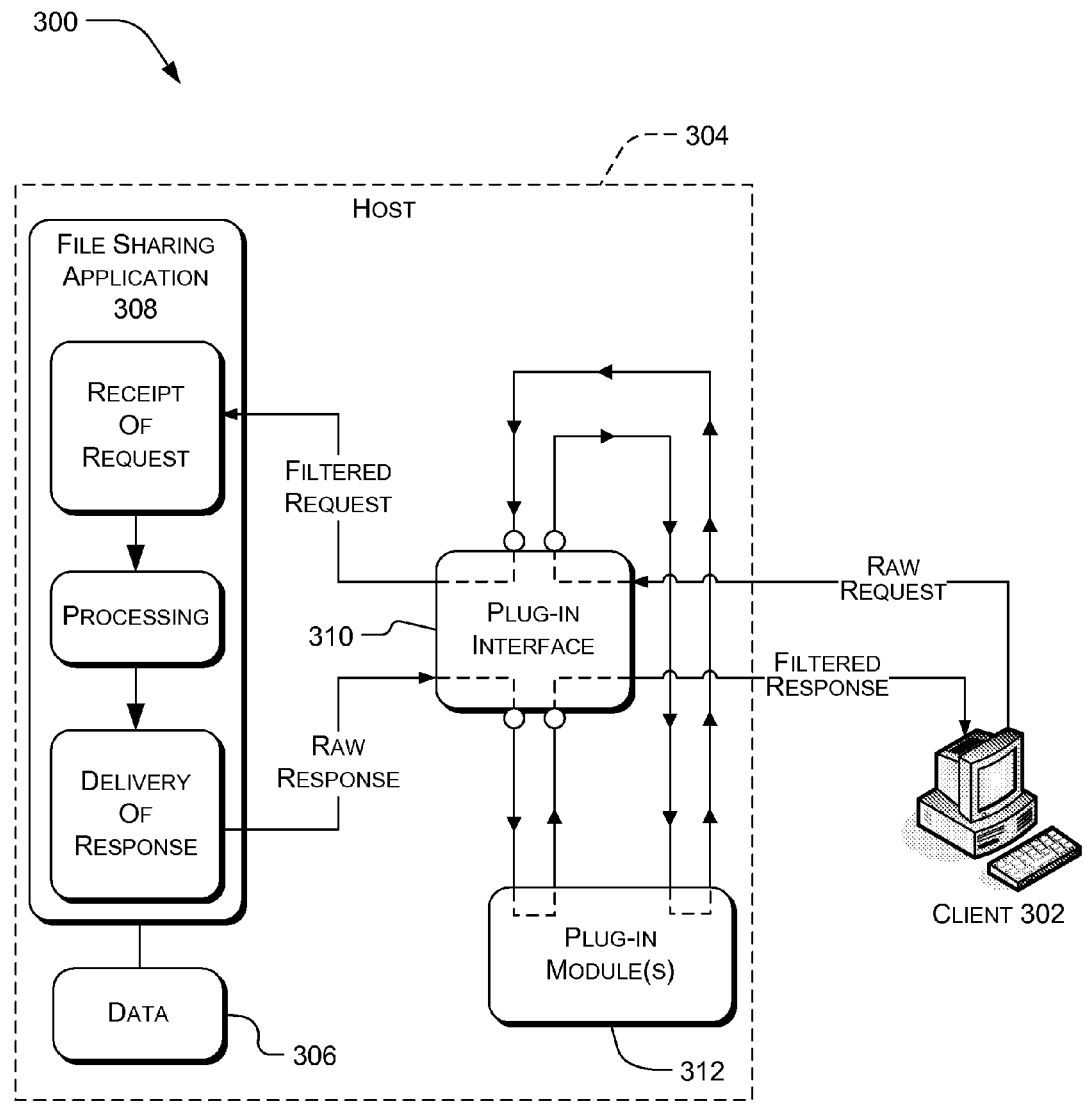
FIG. 3 is a schematic diagram showing a flow of communications in an exemplary file sharing service.

FIG. 3 is a schematic diagram showing a flow of communications (e.g., data, client requests for data, host responses to client requests for data, etc.) in an exemplary file sharing system 300. The system 300 includes a client 302 and a host 304. The host 304 includes data 306 that has been designated to be shared with the client and/or other users on a network. The data 306 is stored in memory associated with the host 304, along with a file sharing application 308 for implementing a file sharing service. An extensible plug-in interface 310 is also provided in memory of the host in association with the file sharing application 308. While FIG. 3 depicts the extensible plug-in interface 310 as a standalone architecture, the interface 310 could additionally or alternatively be included as a part of the file sharing application or an operating system of the host or of another computing device on the network.

The extensible plug-in interface 310 is interposed in the communication path between the client 302 and the host 304, such that communications between the client 302 and the host 304 pass through the architecture 310. The extensible plug-in interface 310 provides an interface between raw client requests or host responses and a system for handling communications among applications on different computers on the network, such as Network Basic Input/Output System (Net-BIOS) resource requests, for example. The extensible nature of interface 310 allows the file sharing service to be expanded by addition of one or more plug-in modules 312. The plug-in modules 312 may be loaded in memory of the host or another computing device on the network, and are in communication with the extensible plug-in interface 310.

The extensible plug-in interface 310 provides the plug-in modules 312 with access to file sharing communications between the client 302 and the host 304. In various implementations, the plug-in modules may be provided with access to the file sharing communications at the time a client request is received, at the time a request is processes, and/or at the time a response to a request is delivered. Access to the file sharing communications may be provided by exposing some or all of the file sharing communications received at the extensible plug-in interface 310 to the plug-in modules 312. The file sharing communications may be exposed to the plug-in modules 312 indiscriminately, or may be monitored by the extensible plug-in interface 310 and selectively exposed to the plug-in modules 312. Additionally or alternatively the extensible plug-in interface 310 may notify the plug-in modules 312 of certain events as the requests are processed, such as when client authentication is requested, when clients are successfully authenticated, and/or when clients fail to be authenticated.

As shown in FIG. 3, when the client 302 requests data stored on the host 304, the raw request is received by the extensible plug-in interface 310. The extensible plug-in interface 310 exposes the raw request to plug-in modules 312. Depending on the circumstances, the plug-in modules 312 may instruct the extensible plug-in interface 310 to modify, append, limit, administer, or otherwise filter the request. Examples of filtering are described below in the section entitled "Exemplary Plug-In Module(s)." If filtering is performed, the filtered request is then relayed to the file sharing application 308, where it is received, processed, and a response is prepared based on the filtered request. If filtering is not performed, the raw request is relayed to the file sharing application 308, where it is received, processed, and a response is prepared based on the raw request.

Whether or not the request was filtered, the file sharing application sends a raw response, which is received at the extensible plug-in interface 310. The extensible plug-in interface 310 exposes the raw response to plug-in modules 312 which, depending on the circumstances, may or may not filter the response prior to relaying the response to the client 302.

In the implementation shown in FIG. 3, all client requests and host responses are exposed to the plug-in modules 312. In other implementations, however, the file sharing communications exposed to the plug-in modules 312 may be limited to only client requests for data, only host responses to data, only communications regarding certain data, or to some other subset of file sharing communications.

Exemplary Plug-In Module(s)

The plug-in modules 312 provide the ability to modify, append, limit, or otherwise filter some or all file sharing communications between the client 302 and the host 304. As discussed above, the plug-in modules may provide instructions to filter client requests for data, host responses to client requests for data, and/or any other type of file sharing communications. Plug-in modules 312 may additionally or alternatively be configured to create logs of various file sharing transactions. In this way, plug-in modules 312 may provide users or administrators with the ability to expand service offerings, manage shared resources, manage security, control user experience, or to perform virtually any other desired function. In some implementations, users/administrators may have the ability to intercept requests for resources and manipulate the requested and delivered bits of data in real-time when a client interacts with the host. This would allow users/administrators the ability to fulfill requests on a per-request basis, and in a secure, controlled manner. In other implementations, user/administrator control may be performed asynchronously, by providing instructions or rules ahead of time that will be performed automatically by the plug-in modules. These and other functions can be performed by any number of one or more plug-in modules.

Figure 4:
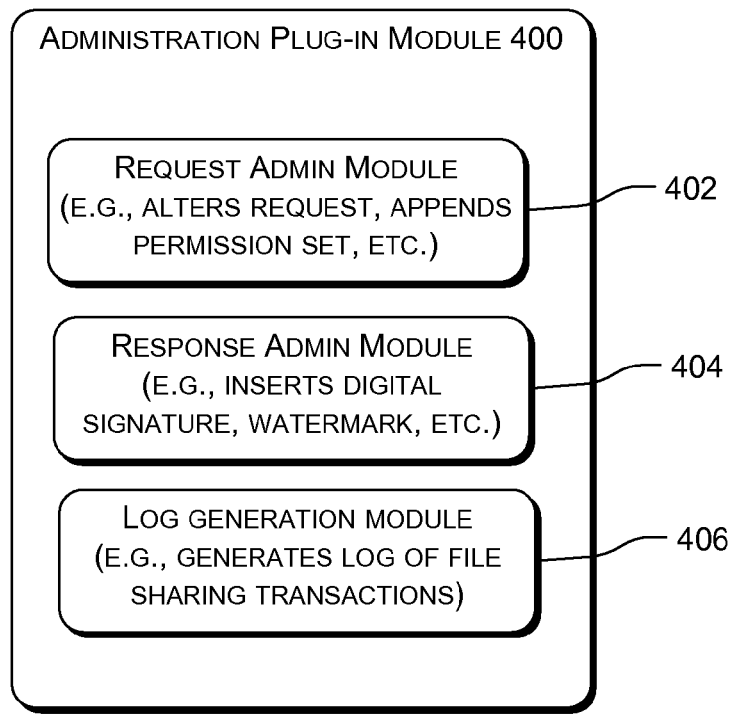
FIG. 4 is a block diagram showing an exemplary administration module of the file sharing service of FIG. 3 in more detail.

FIG. 4 shows an exemplary administration plug-in module 400 that may be coupled to an extensible plug-in interface. In this implementation, the administration plug-in module 400 includes a request administration module 402, a response administration module 404, and a log-generation module 406.

The request administration module 402 allows a user or administrator the ability to filter client requests for data stored on a host. Filtering may be performed manually by the user or administrator in real-time, automatically according to instructions previously provided by the user or administrator, automatically based on one or more default instructions of the administration module 402, or the like. In one example, filtering a client request for data comprises changing the data for which the request was originally issued to include additional or alternative data. In another example, filtering a client request comprises appending a permission set to the request, indicating data that the client is or is not permitted to access from the host.

The response administration module 404 allows a user or administrator the ability to filter host responses to client requests for data stored on the host. Again, filtering may be performed manually or automatically, as described above with respect to the request administration module 402. In one example, filtering a host response comprises modifying data in the response or substituting alternative data for data in the response. In another example, filtering a host response comprises appending a digital rights management (DRM) element to the response or to data associated with the response. More specifically, a plug-in module may notify a user or administrator when a client requests certain content (e.g., copyrighted content, licensed content, or the like), and allow the user or administrator to mark the content with a DRM notice, such as a digital signature or a watermark, before it is provided to the client. In another related example, filtering may include appending a user agreement to the response, such that a user of the client must agree to the terms of the user agreement prior to receiving some or all of the content.

The log-generation module 406 tracks file sharing transactions and generates a log of some or all of these transactions. In one example, the log-generation module may create a transaction log comprising information about file sharing transactions performed by the client, the host, or both. Examples of information that may be stored in a transaction log include a list of client requests for data, a list of host responses to client requests, a list of clients authenticated by the file sharing program, a list of clients that failed authentication, a list of data requested by clients, an amount of data requested and/or received by a client, combinations of these, and/or any other desired file sharing transaction information. In one specific example, an employer administrator may track the number of copies of a certain software program that are downloaded by its employee clients, in order to determine the number of licenses of the software that it needs to purchase. The employer may also track which employee clients have downloaded the software for accounting or other purposes.

While shown as being part of the administration plug-in module 400, the request, administration, and log-generation modules 402-406 could be configured as independent plug-in modules that couple to an extensible plug-in interface directly. Any number of one or more plug-in modules may be provided independently or as part of a composite module, such as the administration module 400. In practice, plug-in modules may be provided to perform virtually any desired function.

Exemplary Computing Device

Figure 5:
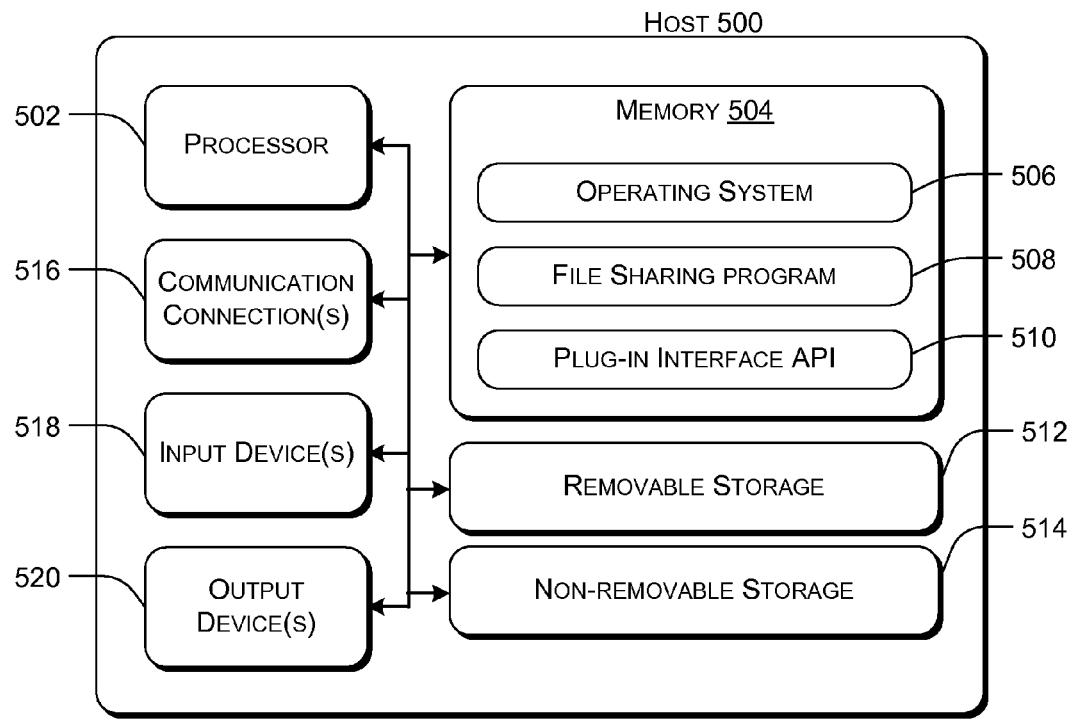
FIG. 5 is a block diagram showing an exemplary host usable with the file sharing system of FIG. 3.

FIG. 5 illustrates a host 500, such as the host 104 or client/host 108 of FIG. 1 or the host/administrator 202 of FIG. 2, in more detail. The host 500 may be configured as any suitable computing device capable of implementing a file sharing application. In one exemplary configuration, the host 500 comprises at least one processor 502 and memory 504. Depending on the configuration and type of computing device, memory 504 may be volatile (such as RAM) and/or non-volatile (such as ROM, flash memory, etc.).

Memory 504 may include an operating system 506, a file sharing application or program 508 for implementing all or a part of a file sharing service, and a plug-in interface application programming interface (API) 510, as well as various other data, programs, media, and the like. The plug-in interface API 510 provides an interface between raw file sharing communications (e.g., requests and responses) and a program handling network communications, such as, for example, a Network Basic Input/Output System (NetBIOS).

The host 500 may also include additional removable storage 512 and/or non-removable storage 514 including, but not limited to, magnetic storage, optical disks, and/or tape storage. The operating system 506, file sharing program 508, and/or plug-in interface API 510 may additionally or alternatively be stored on the removable storage 512 and/or non-removable storage 514.

Computer storage media includes volatile and nonvolatile, removable and non-removable media implemented in any method or technology for storage of information such as computer-readable instructions, data structures, program modules or other data. Memory 504, removable storage 512 and non-removable storage 514 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the host 500.

The host 500 may also contain communication connection(s) 516 that allow the host 500 to communicate with one or more other computers, servers, or other computing devices, via a network. By way of example, and not limitation, communication connection(s)-516 may include wired media such as a wired network or direct-wired connection, and wireless media such as acoustic, RF, infrared and other wireless media.

The host 500 may also include input device(s) 518, such as a keyboard, mouse, pen, voice input device, touch input device, etc., and output device(s) 520, such as a display, speakers, printer, etc. All these devices are well know in the art and need not be discussed at length here.

Exemplary File Sharing Methods

Figure 6:
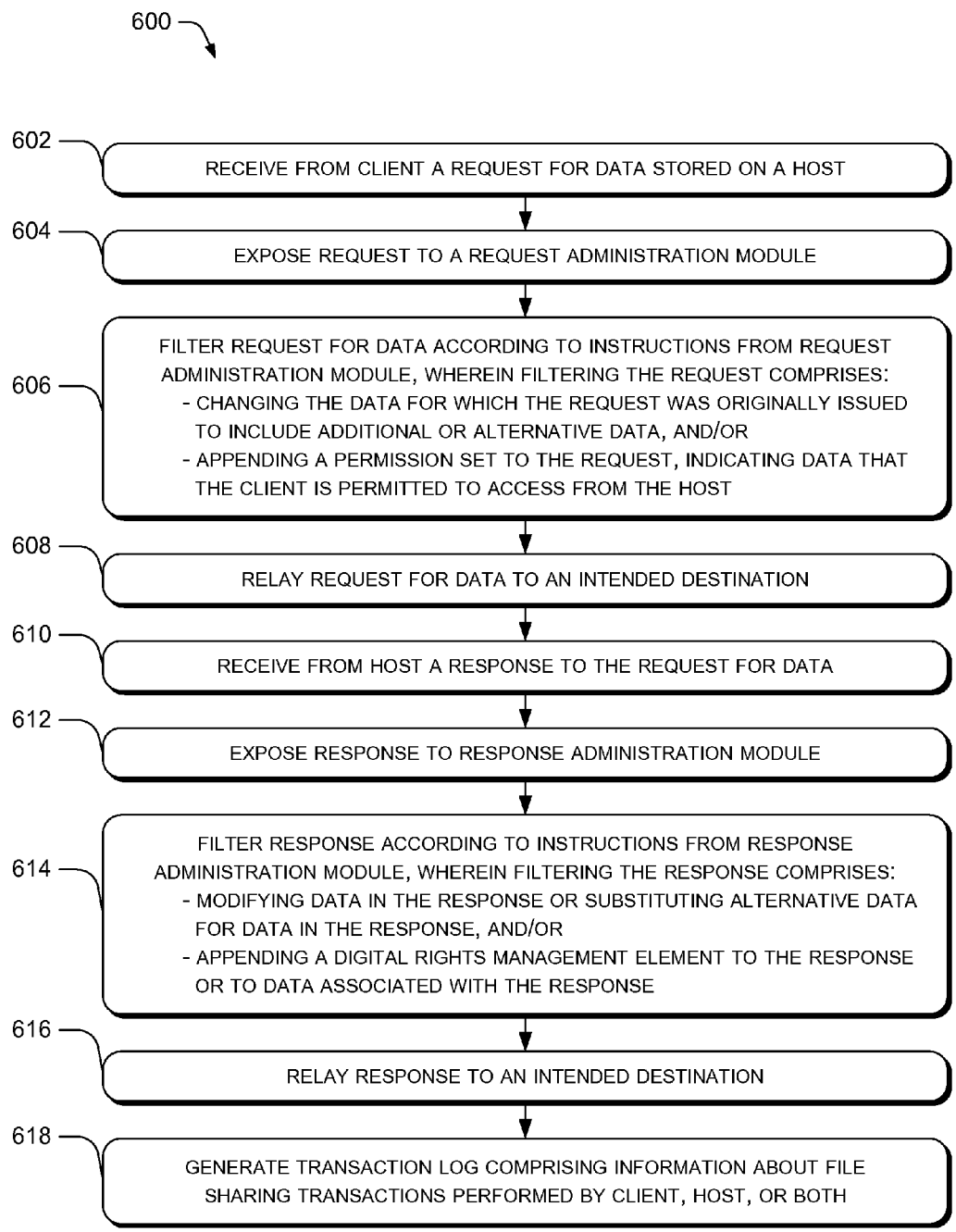
FIG. 6 is a flowchart showing an exemplary file sharing administration method.

FIG. 6 is a flowchart showing an exemplary file sharing method 600. The file sharing method 600 facilitates expansion and/or enhancement of a file sharing program to include additional or alternative functionality. The method 600 may, but need not, be implemented at least partially by a computing device, such as those shown in FIGS. 3 and 5, including a plug-in interface. In one implementation, the method 600 may be implemented by an extensible plug-in interface application programming interface (API). However, the method may be implemented in a host of other ways as well.

Method 600 includes, at 602, receiving from a client a request for data, such as programs, files, content, and the like, stored on a host. At 604, the request is exposed to a module, such as a plug-in request administration module, for example, which may provide some instructions for the handling or filtering of the request. At 606, the request for data may be filtered according to the instructions, if any, from the module. Filtering the request may include changing the data for which the request was originally issued to include additional or alternative data, and/or appending a permission set to the request, indicating data that the client is permitted to access from the host. Once the request has been filtered, if at all, at 608 the request is relayed to its intended destination. The intended destination is usually a processor, file sharing application, communication connection, or the like of the host.

The host's response to the client request for data is received at 610, and, at 612, the response is exposed to a module, such as a plug-in response administration module, for example. At 614, the response from the host is filtered according to instructions, if any, from the response administration module. Filtering the response may include modifying data in the response, substituting alternative data for data in the response, and/or appending a digital rights management element to the response or to data associated with the response. At 616, the response is relayed to an intended destination, usually the client or a processor, file sharing application, or communication connection of the client.

At 618, a transaction log is generated. The transaction log may be useful to a user or administrator to manage and track shared resources. The file sharing log may comprise information about file sharing transactions performed by the client, the host, or both. Examples of information that may be recorded in a transaction log include a record of client requests for data, a record of host responses to client requests, a record of clients authenticated by a file sharing program on the host and/or client, a record of clients that failed authentication, a record of data requested by clients, an amount of data requested and/or received by clients, combinations of these, and the like. The transaction log may be generated on an individual user basis, or on an aggregate basis.

Specifics of one exemplary extensible file sharing method 600 are described above. However, it should be understood that certain acts in the file sharing method 600 need not be performed in the order described, may be modified, and/or may be omitted entirely, depending on the circumstances. For example, if a user or administrator only wants control over client requests, the acts of receiving, exposing, filtering, and/or relaying a client request for data may be performed without any of the other method acts. Likewise, if the user or administrator only wants control over host responses, the acts of receiving, exposing, filtering, and/or relaying a host response to a client request may be performed without any of the other method acts. Additionally or alternatively, log generation may be omitted from the method, and/or may be performed alone without any of the other method acts.

Figure 7:
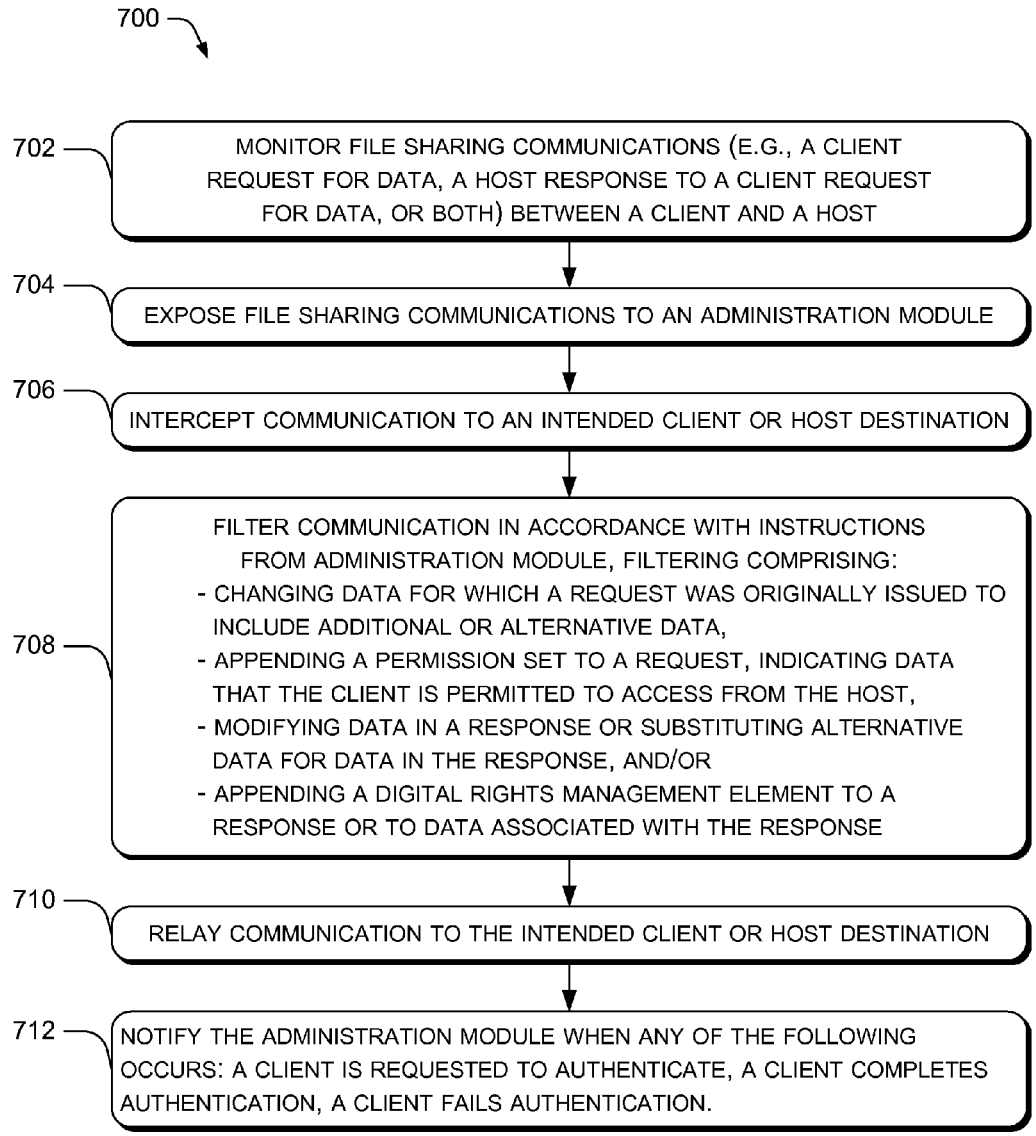
FIG. 7 is a flowchart showing another exemplary file sharing administration method.

FIG. 7 is a flowchart showing another exemplary file sharing method 700 that facilitates expansion and/or enhancement to include additional or alternative functionality. As with the previous method, method 700 may be implemented at least partially by an extensible plug-in interface API stored in memory of a computing device, such as those shown in FIGS. 3 and 5. However, method 700 may also be implemented in numerous other ways.

Method 700 comprises, at 702, monitoring file sharing communications between a client and a host. The communications monitored may include client requests for data stored on a host, host responses to client requests for data, the actual data requested, and the like. Some or all of the file sharing communications are, at 704, exposed to a module, such as a plug-in administration module. In some implementations, all file sharing communications are indiscriminately exposed to the module, while in other implementations, only select file sharing communications are exposed to the module based on one or more predetermined criteria (e.g., communications relating to specified data, by specified clients, etc.). Upon exposure to the file sharing communications, the module may provide instructions for the handling or filtering of the communication.

At 706, a communication to an intended client or host destination is intercepted. At 708, the communication is filtered in accordance with instructions, if any, received from the module. If the file sharing communication is a client request for data, filtering comprises changing data for which the request was originally issued to include additional or alternative data, and/or appending a permission set to the request, indicating data that the client is permitted to access from the host. If the file sharing communication is a host response to a client request for data, filtering comprises modifying data in the response, substituting alternative data for data in the response, and/or appending a digital rights management element to the response or to data associated with the response.

At 710, the communication is relayed to the intended destination. If the file sharing communication is a client request for data, the intended destination will usually, but not necessarily, be a processor, file sharing application, communication connection, or the like, of the host. If the file sharing communication is a host response to a client request for data, the intended destination will usually, but not necessarily, be the client or a processor, file sharing application, or communication connection of the client.

In some implementations, method 700 further includes, at 712, notifying the module when various events occur. For example, a notification may be made when a client is requested to authenticate itself to the host or file sharing application, when a client completes authentication successfully, when a client fails authentication, and the like.

Specifics of exemplary extensible file sharing method 700 are described above. However, it should be understood that certain acts in the file sharing method 700 need not be performed in the order described, may be modified, and/or may be omitted entirely, depending on the circumstances. For example, the notification may be omitted from the method, and/or may be performed alone without any other of the acts described above.

Moreover, any of the acts described above may be implemented by a computer, processor or other computing device based on instructions stored on one or more computer-readable media. As discussed above, computer-readable media can be any available media that can be accessed by a computing device to implement the instructions stored thereon.

Conclusion

Although the subject matter has been described in language specific to structural features and/or methodological acts, the subject matter defined in the appended claims is not necessarily limited to the specific features or acts described. Rather, the specific features and acts are disclosed as exemplary forms of implementing the claims. For example, the methodological acts need not be performed in the order or combinations described herein, and may be performed in any combination of one or more acts.

What is claimed is:

1. One or more computer-readable storage devices comprising computer-executable instructions for administering file sharing over a network, the instructions comprising instructions for:

receiving, at an extensible plug-in architecture and from a client, a request for a file stored on a host, the request being received at an extensible plug-in interface interposed in a communication path between the client and the host;

exposing the request to a request administration module;

relaying the request for the file to an intended destination of the request;

receiving from the host a response to the request for the file;

exposing the response to a response administration module, the request administration module and the response administration module comprising plug-in modules within the extensible plug-in architecture, the plug-in modules being configured to intercept the request, manipulate the response and track a plurality of file sharing transactions;

filtering the response from the host according to instructions from the response administration module, prior to relaying the response to an intended destination of the response, filtering the response comprising appending a digital rights management element to the response or to data associated with the response, the digital rights management element comprising a digital signature or a watermark; and relaying the response to an intended destination of the response.

2. The one or more computer-readable storage devices of claim 1, further comprising instructions for filtering the request for the file according to instructions from the request administration module, prior to relaying the request for the file to the intended destination of the request.

3. The one or more computer-readable storage devices of claim 2, wherein filtering the request for the file comprises changing data for which the request was originally issued to include additional or alternative data.

4. The one or more computer-readable storage devices of claim 2, wherein filtering the request for the file comprises appending a permission set to the request, indicating data that the client is permitted to access from the host.

5. The one or more computer-readable storage devices of claim 1, wherein filtering the response further comprises modifying data in the response or substituting alternative data for data in the response.

6. The one or more computer-readable storage devices of claim 1, wherein the computer-executable instructions are implemented by an application programming interface (API).

7. The one or more computer-readable storage devices of claim 1, further comprising instructions for generating a transaction log comprising information about file sharing transactions performed by the client, the host, or both.

8. A method implemented at least partially by a computing device of administering file sharing over a network, the method comprising:

monitoring, by the computing device, file sharing communications between a client and a host using an extensible plug-in architecture by interposing an extensible plug-in interface in a communication path between the client and the host, the extensible plug-in interface providing for bi-directional communication between the client and the host;

exposing file sharing communications to an administration module, the administration module comprising plug-in modules within the extensible plug-in architecture, the plug-in modules being configured to intercept a request, manipulate a response and track a plurality of file sharing transactions; and intercepting a communication to an intended client destination, and filtering the communication in accordance with instructions received from the administration module, before relaying the communication to the intended client destination;

the communication comprising a host response to a client request for data, and filtering the communication comprising appending a digital rights management element to the response or to data associated with the response.

9. The method of claim 8, wherein a file sharing communication comprises a client request for data, a host response to a client request for data, or both.

10. The method of claim 8, further comprising notifying the administration module when any of the following occurs: a client is requested to authenticate, a client completes authentication, a client fails authentication.

11. The method of claim 8, further comprising intercepting a communication to an intended host destination, and filtering the communication to the intended host destination in accordance with instructions received from the administration module, before relaying the communication to the intended host destination, and wherein the communication to the intended host destination comprises a client request for data, and filtering the communication to the intended host destination comprises at least one of:

changing data for which the request was originally issued to include additional or alternative data, or appending a permission set to the request, indicating data that the client is permitted to access from the host.

12. The method of claim 8, wherein filtering the communication further comprises:

modifying data in the response or substituting alternative data for data in the response.

13. A system comprising:

a processor; and computer-readable media comprising instructions for implementing:

a file sharing service facilitating file sharing between a client and a host over a network, and an extensible plug-in architecture providing an interface by which the file sharing service can be expanded to include additional functionality, the extensible plug-in architecture comprising:

an extensible plug-in interface interposed in a communication path between the client and the host, the extensible plug-in interface providing for bi-directional communication between the client and the host; and a plurality of plug-in modules, the plurality of plug-in modules being configured to intercept a request from the client and a response from the host, manipulate the response from the host by appending a digital rights management element to the response from the host, and track a plurality of file sharing transactions.

14. The system of claim 13, wherein the extensible plug-in architecture comprises an application programming interface (API).

15. The system of claim 13, wherein the computer-readable media further comprises instructions for implementing an administration plug-in module configured to administer file sharing.

16. The system of claim 15, wherein the administration plug-in module comprises a request administration module for administering client requests for data, and a response administration module for administering host responses to client requests for data.

* * * * *